April 5, 1949.  W. E. FORCUM  2,466,403
PRESSURE RELIEVING AND VENTILATING
ATTACHMENT FOR AUTOMOBILE BODIES
Filed Sept. 7, 1945  2 Sheets-Sheet 1

Inventor
Walter E. Forcum

By Clarence A. O'Brien
and Harvey B. Jackson
Attorneys

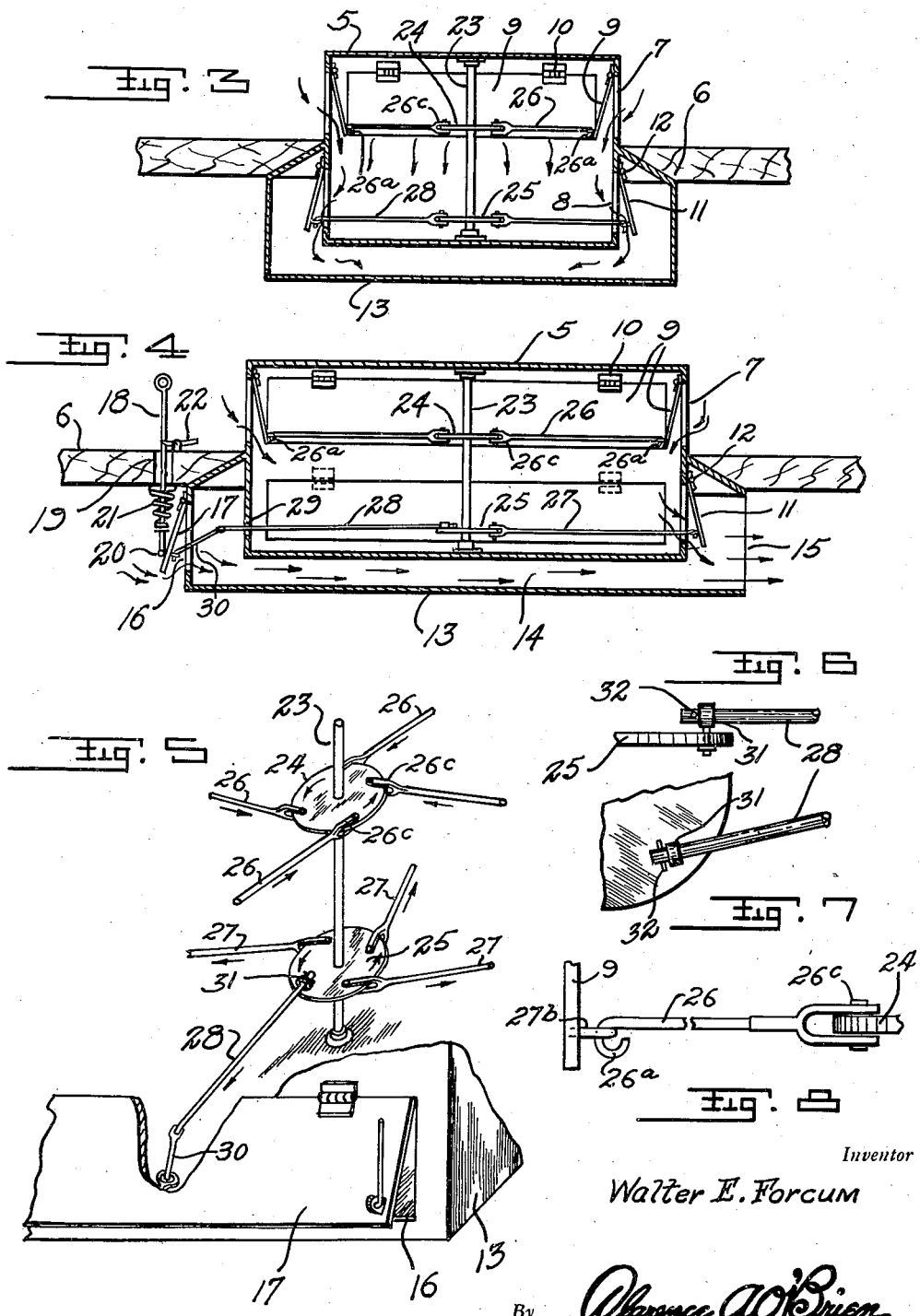

Patented Apr. 5, 1949

2,466,403

UNITED STATES PATENT OFFICE 2,466,403

PRESSURE RELIEVING AND VENTILATING ATTACHMENT FOR AUTOMOBILE BODIES

Walter E. Forcum, St. Louis, Mo.

Application September 7, 1945, Serial No. 614,979

2 Claims. (Cl. 98—2)

1

The present invention relates to new and useful improvements in attachments for automobile bodies designed for use in automatically releasing air pressure created in the body by the closing of a door and while the windows of the automobile are also closed and also providing means for removing hot or cold air from the automobile body while the automobile is moving.

More specifically, the invention embodies the provision of a chamber mounted in the floor of the automobile and extending through the floor above and beneath the latter and including hinged doors in the sides of the chamber adapted to automatically swing into open position by air pressure created in the body of the automobile by the closing of a door when the windows thereof are closed, and also including manually controlled doors for creating a suction through the bottom portion of the chamber whereby to draw air from the body of the automobile outwardly through the chamber during the movement of the automobile.

A further object of the invention is to provide an apparatus of this character of simple and practical construction, which is efficient and reliable in operation, relatively inexpensive to manufacture and install in operative position, and otherwise well adapted for the purpose for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 1:
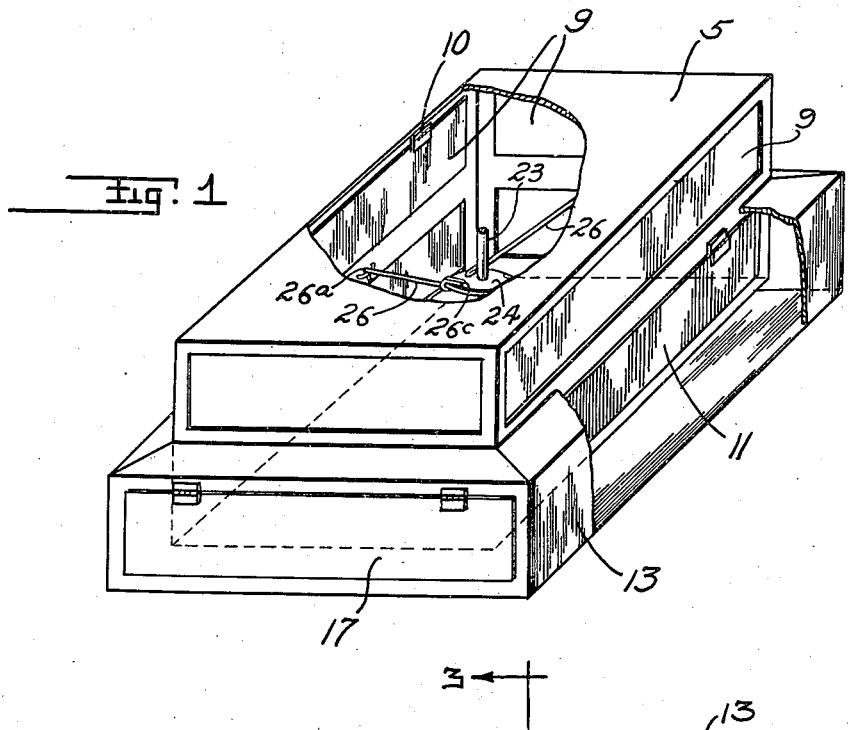
Figure 1 is a perspective view of the device.
Figure 2:
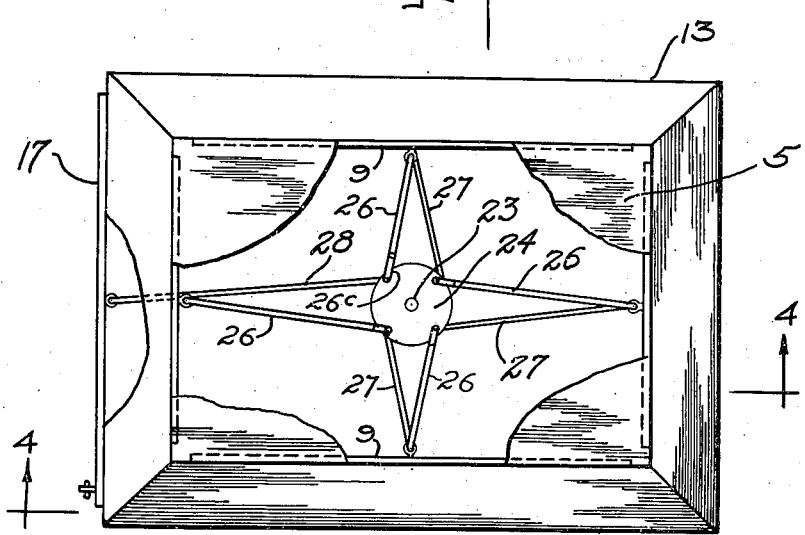
Figure 2 is a top plan view with parts broken away and shown in section.

Figure 3 is a transverse sectional view taken substantially on a line 3—3 of Figure 2, Figure 4 is a longitudinal sectional view taken substantially on a line 4—4 of Figure 2, Figure 5 is an enlarged perspective view of the control arms for the upper and lower groups of doors, Figure 6 is a fragmentary side elevational view of the connection for the control arm of the manually operable door, Figure 7 is a fragmentary view in side elevation of one of the upper arms, and Figure 8 is a top plan view of the links connecting the manually operable door with its control arm.

Referring now to the drawings in detail, wherein, for the purpose of illustration, I have

2 disclosed a preferred embodiment of the invention, the numeral 5 designates a rectangular box-like chamber adapted for mounting in an opening in the floor 6 of an automobile, with the upper portion of the chamber projecting above the floor and with the lower portion of the chamber projecting below the floor, as indicated in Figures 3 and 4 of the drawings.

Each side of the upper portion of the chamber 5 is formed with openings 7 and similar openings 8 are formed in each side of the lower portion of the chamber.

The upper openings 7 are closed by means of upper doors 9 hinged at their upper edges, as at 10, to the inside of the chamber for inward swinging movement of the door.

The lower openings 8 are closed by means of doors 11 hinged at their upper edges, as at 12, to the outer side of the chamber for outward swinging movement of the lower door.

Accordingly, when air pressure is created in the body of the automobile, as by the closing of a door with all of the windows of the automobile closed, the upper doors 9 will be forced inwardly into open position, while the lower doors 11 will be forced outwardly into open position, as indicated in Figure 3 of the drawings, whereby air will be permitted to pass through the chamber 5 to the atmosphere under the floor 6, as indicated by the arrows.

The portion of the chamber 5 below the floor 6 is enclosed within a shell or casing 13 having its walls spaced from the lower portion of the chamber 5 to provide an air chamber 14 between the casing 13 and the chamber 5.

The rear wall of the casing 13 is open, as indicated at 15, and the front wall of the casing 13 is formed with an opening 16 adapted to be closed by a door 17 hinged at its upper edge to the outer side of the casing for outward swinging movement of the door into its open position.

The door 17 is moved into its open position by means of a rod 18 mounted for free vertical movement in an opening 19 in the floor 6 and pivotally connected at its lower end to the door 17, as indicated at 20. A coil spring 21 is mounted on the lower end of the rod 18 in a manner to urge the rod 18 downwardly for closing the door. The rod 18 may be secured in its raised, vertically adjusted position by means of a conventional form of catch device 22 mounted on the upper surface of the floor 6 whereby to secure the door 17 in an adjustable, open position. The catch device 22 is of forked form to straddle the rod 18 and in which said rod may be moved rearwardly and wedged into the same.

In order that the upper and lower doors 9 and 11, as well as the door 17, may be manually opened and closed by the rod 18, I provide a vertical shaft 23 journaled in the top and bottom of the chamber 5 and to which upper and lower disks 24 and 25 are secured. Upper arms 26 are pivotally attached at one end to the upper doors 9 and are pivotally attached at their other ends eccentrically to the upper disk 24 whereby a rotation of the shaft 23 will simultaneously open and close the upper doors 9. The upper arms 26 may be attached to the doors 9 by a hook end 26a thereon and an eye 26b in the door 9 forming a swivel connection, and said arms 26 may be attached to the disk 24 by a loose fork and pin compensating connection 26c.

The lower doors 11 are similarly attached to the lower disk 25 by means of arms 27 to likewise open and close the lower doors by a rotation of the shaft 23.

The front door 17 of the casing 13 is likewise attached to the lower disk 25 by means of an arm 28 swingably and slidably mounted in a bearing guide 29 in the front, lower wall of the chamber 5, the front end of the arm 28 being pivotally attached to the door 17 by means of a compensating universal link 30, while the rear end of the arm 28 is loosely slidably mounted in an eye 31 eccentrically pivoted on the disk 25. A transverse pin 32 is carried by the rear end of the arm 28 behind the eye 31 to permit free rearward sliding movement of the arm 28 and to engage the eye 31 during a forward movement of the arm 28 to rotate the disk 25 and thus rotate the shaft 23 and move all of the doors into opening positions during the opening of the door 17.

Accordingly, by opening the door 17 by the rod 18, the shaft 23 will be rotated in a manner to open all of the doors 9 and 11 and thus during the movement of the automobile, air will enter the opening 16 at the front of the casing 13 to travel therethrough outwardly at the rear open end 15 thereof, and thus to draw air from the body of the automobile through the upper opening 7 and lower openings 8 of the chamber 5 to thus ventilate the interior of the automobile.

When the door 17 is closed, the upper and lower doors 9 and 11 will gravitate into closed position. This is rendered possible because the eye 31 is slidable on the arm 28.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described.

Having thus described the invention, what I claim is:

1. An attachment for closed vehicle bodies comprising a chamber forming casing positioned in the floor of the body and extending above and below the floor, doors for the chamber hinged on the casing above and below the floor, a shell surrounding the casing below the floor and having front and rear openings, a front door for the front opening of the shell, and manually operable means for opening all of the doors, said openings in the shell creating suction in the shell and chamber when said doors are open to ventilate the body during forward movement of the vehicle.

2. An attachment for closed vehicle bodies comprising a chamber forming casing positioned in the floor of the body and extending above and below the floor, doors for the chamber hinged on the casing above and below the floor, a shell surrounding the chamber below the floor and having front and rear openings, a front door for the front opening of the shell, manually operable means for opening the front door of the shell, and means operatively connecting said front door to the remaining doors for simultaneous opening movement of said remaining doors by opening movement of said front door comprising a rotary sliding connection permitting opening of said remaining doors independently of opening of the front door in response to air pressure created in the body whereby to provide for atmospheric communication with the body through said chamber and shell by way of the rear opening in said shell.

WALTER E. FORCUM.

REFERENCES CITED

The following references are of record in the file of this patent:

UNITED STATES PATENTS

| Number | Name | Date |
|---|---|---|
| 1,219,893 | Woolf | Mar. 20, 1917 |
| 1,787,561 | Askam | Jan. 6, 1931 |
| 2,224,494 | White | Dec. 10, 1940 |
| 2,239,767 | Anderson | Apr. 29, 1941 |